United States Patent [19]

Samuelsson

[11] Patent Number: 4,705,251

[45] Date of Patent: Nov. 10, 1987

[54] SELF-ERECTING TRIPOD APPARATUS

[76] Inventor: Soren Samuelsson, 74-259 Candlewood St., Palm Desert, Calif. 92260

[21] Appl. No.: 900,329

[22] Filed: Aug. 25, 1986

[51] Int. Cl.$^4$ .............................................. G03B 21/56
[52] U.S. Cl. .................................... 248/171; 248/169; 248/188; 248/188.8
[58] Field of Search ............... 248/171, 170, 169, 168, 248/166, 434, 435, 188, 188.3, 188.7, 351, 96, 188.8; 108/128, 115, 123

[56] References Cited

U.S. PATENT DOCUMENTS

| | | | |
|---|---|---|---|
| 686,006 | 11/1901 | McConnell | 248/169 |
| 686,872 | 11/1901 | Whetham | 248/169 |
| 744,386 | 11/1903 | Norton | . |
| 1,287,365 | 12/1918 | Livingston | . |
| 1,571,440 | 2/1926 | Smith | . |
| 1,686,774 | 10/1928 | Sperry | 248/96 |
| 1,731,139 | 10/1929 | Kift | . |
| 1,752,114 | 3/1930 | Shaw | 248/96 |
| 1,960,099 | 5/1934 | Donovan | 248/96 |
| 1,999,844 | 4/1935 | McElroy | . |
| 2,051,833 | 8/1936 | Ehrlich | 248/161 |
| 2,142,570 | 1/1939 | Martin | 248/162 |
| 2,282,285 | 5/1942 | Olson | 248/168 |
| 2,297,980 | 10/1942 | Perkins | 248/171 |
| 2,586,149 | 2/1952 | Coble | 304/4 |
| 2,709,560 | 5/1955 | Resk | 248/169 |
| 3,064,932 | 11/1962 | Halderman | 248/171 |
| 3,696,856 | 10/1972 | Potter | 160/24 |
| 3,841,594 | 10/1974 | Zinn | 248/169 |
| 4,309,010 | 1/1982 | Lusanne | 248/168 |

Primary Examiner—Reinaldo P. Machado
Assistant Examiner—Alvin Chin-Shue
Attorney, Agent, or Firm—Fulwider, Patton, Rieber, Lee & Utecht

[57] ABSTRACT

A tripod for supporting a window washer's bucket or the like. The support incorporates three legs pivotally connected under a cage for receiving the bucket and pivotable between retracted co-extensive positions and spread positions angling downwardly and outwardly. The positioning of the legs is controlled by an actuator telescoped upwardly into the open bottom end of a vertical actuator tube mounted under the cage. The actuator is normally positioned in an extended position projecting downwardly beyond the bottom ends of the legs when they are in their collapsed position. Rigid coupling links are pivotally connected between the actuator an support legs such that retraction of the retractor upwardly into the tube raises the proximate ends of the links upwardly driving the lower end of the support legs radially outwardly to their support positions.

3 Claims, 7 Drawing Figures

U.S. Patent    Nov. 10, 1987    4,705,251
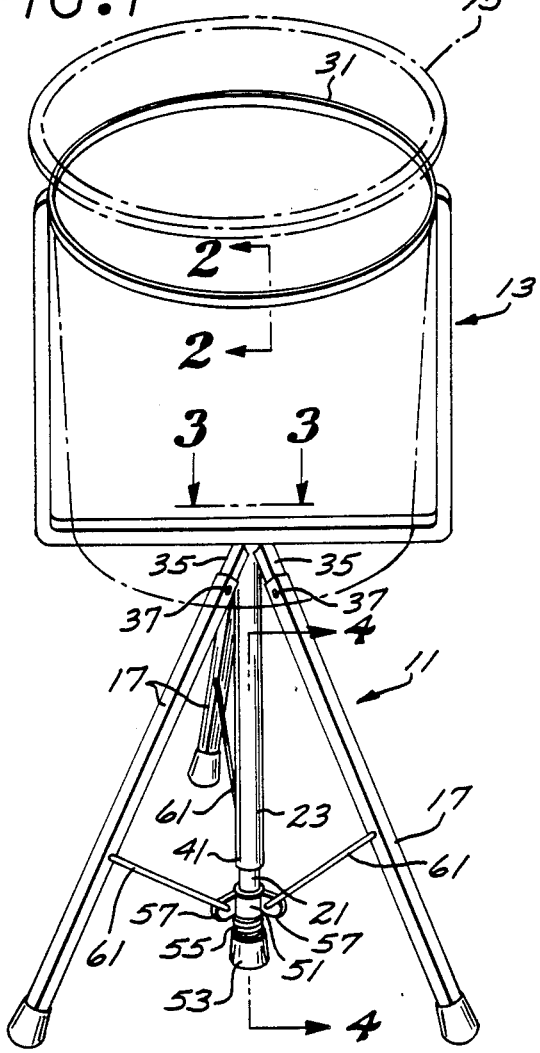
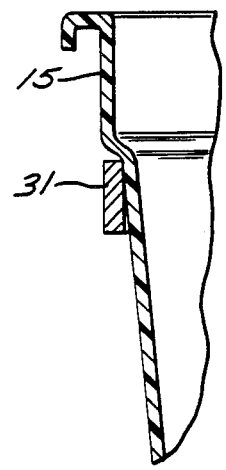
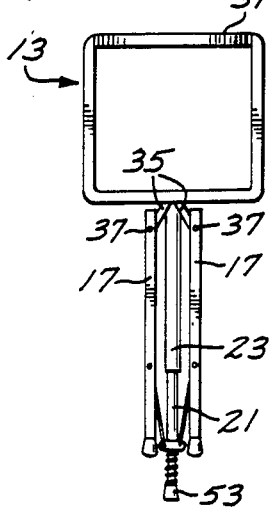
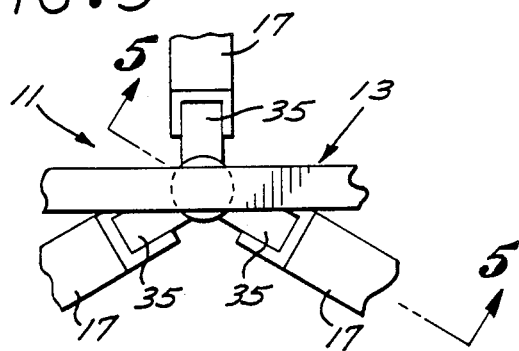
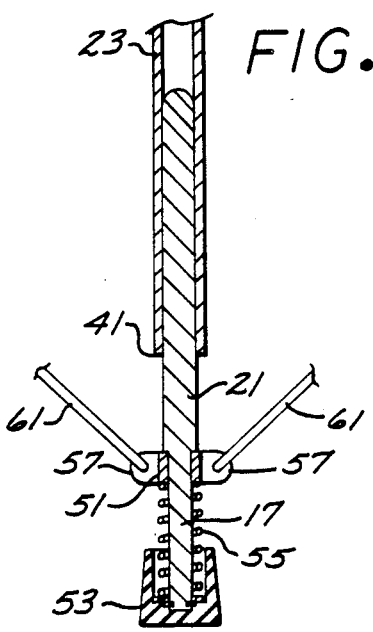
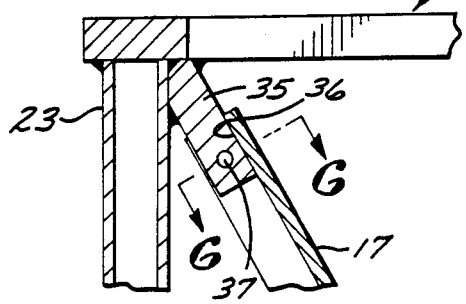
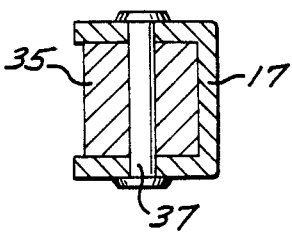

SELF-ERECTING TRIPOD APPARATUS

BACKGROUND OF THE INVENTION

1. Field of the Invention

The present invention relates to tripod supports.

2. Description of the Prior Art

Tripod supports have been used for many different applications. The advantages of such supports are well recognized from the fact that the support legs may be collapsed into co-extensive position for convenient storage or travel and, when the location of use is reached, such legs may be conveniently expanded to their support positions.

Prior art tripod supports have been proposed for maintaining a vertical post erect for supporting a camera from the top thereof. Such supports have been proposed which incorporate telescopical tubes projecting downwardly from the posts with a biasing spring interposed between the post and tube such that the bias of the spring carries a portion of the weight of the camera. A device of this type is shown in U.S. Pat. No. 2,709,560 to Resk.

Other tripod support arrangements are shown in U.S. Pat. Nos. 744,386, 1,571,440, 1,287,365 and 2,282,285.

These prior art tripod supports suffer the shortcoming that erection thereof require manual manipulation of the tripod legs, a task that typically occupies both hands of the user.

SUMMARY OF THE INVENTION

The tripod support apparatus of the present invention is characterized by a central downwardly opening tube having telescoped thereinto an actuator rod which, in its extended position, projects downwardly beyond the ends of the support legs. Coupled between lower end of the rod and the intermediate portion of the support legs are rigid links. Thus, when the tripod support is lowered onto a support surface, the bottom end of the actuator rod will engage the underlying support surface and continued lowering of the tripod support will cause such rod to be driven upwardly into the tube thus raising the inner extremities of the links upwardly causing the opposite ends of such links to push the legs radially outwardly to their expanded support positions.

Other objects and features of the invention will become apparent from consideration of the following description taken in connection with the accompanying drawing.

DESCRIPTION OF THE DRAWING

FIG. 1 is a perspective view of a self-expanding tripod apparatus embodying the present invention;

FIG. 2 is a partial vertical sectional view, in enlarged scale, taken along the line 2—2 of FIG. 1;

FIG. 3 is a partial horizontal sectional view, in enlarged scale, taken along the line 3—3 of FIG. 1;

FIG. 4 is a partial vertical sectional view, in enlarged scale, along the line 4—4 of FIG. 1;

FIG. 5 vertical sectional view taken the line 5—15 of FIG. 3;

FIG. 6 is a transverse sectional view taken along the line 6—6 of FIG. 5; and

FIG. 7 is a side elevational view, in reduced scale, depicting the self-expanding tripod apparatus of FIG. 1 in its collapsed position.

DESCRIPTION OF THE PREFERRED EMBODIMENT

Referring to FIGS. 1 and 4, the self-expanding tripod apparatus, generally designated 11, is intended to support, for instance, a cylindrical cage 13 which mounts a window washer's bucket shown in phantom. The tripod 11 is constructed of conventional support legs 17 and those legs are linked intermediately with an actuator rod 21 telescoped upwardy into the open end of a vertical actuator tube 23 supported from the cage 13. The rod 21 is of sufficient length to, when the legs 17 are in their collapsed position shown in FIG. 7, project downwardly beyond the bottom extremities of the support legs 17. Consequently, when the apparatus is lowered onto a support surface the bottom of the rod 21 will engage the support surface and be driven upwardly into the tube 23 thus driving the lower extremities of the support leg 17 outwardly to their expanded support positions.

While the self-expanding tripod apparatus of the present invention may be utilized for numerous different application, it has particular utility in the commercial window washing area. Frequently, a window washer washing windows from ground level will utilize a tripod support to support his bucket of cleaning fluid at an elevated position to thus eliminate the fatiguing exercise of repeatedly bending over to wash, clean or rinse his cleaning tools in the cleaning fluid. Since the tripod support is frequently lifted to be carried about in a collapsed position, it is necessary for the washing personnel to, each time a new location is reached, manually spread the tripod legs to support the bucket. This repeated task consumes considerable time during an entire work day. Additionally, since the window washer himself is typically carrying tools in his hands or has such tools suspended from his belt, a certain awkwardness is frequently encountered in manipulating the tripod to its expanded supporting position. Accordingly, there is a need for a tripod support apparatus which is operative to expand the legs to their supporting position each time the tripod is to be spread for supporting the washer's bucket at a new location.

The self-opening tripod apparatus of the present invention is shown in the preferred embodiment for supporting a bucket cage in the form of a U-shaped yoke supporting at the upper extremity thereof a circular ring 31 which receives and supports the upper extremity of the bucket 15.

Referring to FIGS. 3 and 5, mounted on the underside of the cage 13 is a mounting bracket formed with three downwardly and outwardly angled rigid stub rods 35, each of which have an associated support leg 17 pivotally connected thereto by means of a pivot pin 37 (FIG. 6). Referring to FIG. 5, it will be noted that the pivot pin 37 connects the legs 17 to the stub rods such that outward rotation of the lower extremities of the legs 17 is limited by contact of the abutting surface 36 with the confronting face of the rods 35.

Mounted centrally between the stubs 35 is the retractor tube 23. Referring to FIGS. 1 and 7, the retractor tube terminates in a lower end 41 disposed intermediate the length of the support legs 17 and the retractor rod 21 telescopes freely thereinto (FIG. 4). The retractor rod 21 is formed along at its lower length with a reduced in diameter stem 47 which terminates in its upper extremity at a downwardly facing annular shoulder 49. Received slidable over the stem 47 is a collar 51.

Mounted on the lower end of the stem 47 is a cup shaped foot 53. Interposed between such foot and the collar 51 is a compression spring 55 which biases the collar 51 upwardly against the shoulder 49.

The collar 51 is formed with three laterally projecting ears disposed equidistant thereabout. Pivotally connected between the respective ears 57 and the intermediate portions of the respective legs 17 are respective rigid links 61 which angle upwardly and outwardly from the collar 51 to push the lower extremities of the legs 17 outwardly as the retractor rod is driven upwardly in the tube 23.

It will be understood by those skilled in the art that the function of expanding the legs 17 outwardly may be achieved by a number of different means, such as cams or rollers driven upwardly by the actuator rod 21 to contact such legs and drive them outwardly.

In operation, when the tripod apparatus is to be erected, the workmen may merely bring the entire apparatus 11 into vertical position over the support surface. As the apparatus is lowered, the foot 53 of the actuator rod 41 will engage the support surface and be driven upwardly as lowering of the apparatus is continued. Driving of the rod 21 upwardly, serves to raise the lower extremities of the connector link 61 upwardly thus causing the links to push the medial portions of the legs 17 outwardly to the position shown in FIG. 1. That outward pushing will continue until the upper ends 36 of the support legs 17 engage the outward faces of the stubs 35 thus limiting further outward rotation of such legs (FIG. 5). However, continued retraction of the rod 21 upwardly in to the post 23 is permitted due to the fact that the collar 57 is free to be pushed downwardly relatively to such rod 21 against bias of the spring 47 (FIG. 4). This feature will avoid any possibility of the support apparatus becoming high centered due to any unevenness in the underlying support surface.

It will be appreciated that expansion of the tripod apparatus is thus achieved by the act of the workmen merely lowering the apparatus on to the support surface. This operation may be achieved by one hand while the other hand is occupied with tools or the like. Subsequently, when the bucket 15 and cage 13 is picked up by the workmen, the support legs 17 will fall downwardly and inwardly under the influence of gravity. This retraction of the legs 17 is enhanced by gravitational influence on the rod 21 which tends to draw the inner extremities of the link 61 downwardly thus drawing the lower extremities of the support legs 17 inwardly.

From the foregoing it will be apparent that the self-expanding tripod apparatus of the present invention is relatively economical to manufacture and provides a tripod support which will be erected automatically upon the workmen moving the apparatus itself into position.

Various modifications and changes may be made with regard to the foregoing detailed description without departing from the spirit of the invention.

I claim:

1. A self-expanding tripod apparatus for supporting a container platform in an elevated positon and comprising:
   a mounting platform;
   a mounting bracket under said platform comprising three rigid downwardly and outwardly angled stub rods;
   three support legs of a predetermined length pivotally mounted below their upper ends to said rods and pivotable between respective positions with their lower ends collapsed inwardly toward one another and respective support positions disposed expanded outwardly away from one another;
   stop means comprising portions of said legs projection above said pivots for abutting said rods to limit said support legs from pivoting outwardly away from one another beyond said respective support positions;
   an elongated telescopical actuator including upper and lower members having a combined length greater than said predetermined length, the upper end of said upper member being affixed to said platform and said lower member arranged to telescope vertically with respect to said upper member;
   a collar mounted slidably on said lower member for sliding vertically with respect thereto;
   a foot mounted on the bottom end of said lower member;
   a coil spring interposed between said foot and collar for biasing said collar upwardly away from said foot;
   three coupling links pivotally connected on their opposite ends to said collar and legs, respectively, said coupling links, foot and spring being so sized and arranged as to cause said foot, when said support legs are in said retracted positions, to project beyond the bottom ends of said support legs to, when said apparatus is lower end onto a support surface, cause said foot to engage such support surface to drive said lower member upwardly causing said spring to drive said collar upwardly to drive the bottoms of said links upwardly to drive the lower extremities of said support legs outwardly to said support positions to engage said stop means, so that continued upward travel of said foot relative to said collar will cause said spring to collapse to permit said lower member to be driven upwardly relative to said collar whereby said apparatus may be supported on a support surface with said foot being in a plane different from that of said bottom ends of said support legs.

2. Self-expanding tripod apparatus as set forth in claim 1 wherein;
   said links are of such a length as to, when said legs are in said retracted positions, restrain said lower member against escape from said upper member.

3. Self-expanding tripod apparatus as set forth in claim 1 wherein;
   said lower member is formed with a downwardly facing shoulder and said collar is sized to abut against said shoulder to limit upwardly travel thereof on said lower member.

* * * * *